(12) United States Patent
Aziz et al.

(10) Patent No.: US 8,552,375 B1
(45) Date of Patent: Oct. 8, 2013

(54) SWITCHED CAPACITOR FILTER SYSTEMS AND METHODS

(75) Inventors: Naseem Y. Aziz, Goleta, CA (US); Robert F. Cannata, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 1012 days.

(21) Appl. No.: 12/486,337

(22) Filed: Jun. 17, 2009

(51) Int. Cl.
*G01J 1/00* (2006.01)
*G01J 1/02* (2006.01)
*H04B 1/10* (2006.01)
*H03K 5/00* (2006.01)

(52) U.S. Cl.
USPC ............... 250/336.1; 250/338.1; 327/554; 327/100

(58) Field of Classification Search
USPC ............... 327/554, 100; 250/336.1, 338.1; 307/108, 109, 110
See application file for complete search history.

(56) References Cited

U.S. PATENT DOCUMENTS

| | | | |
|---|---|---|---|
| 4,364,116 A * | 12/1982 | Nossek | ............ 708/819 |
| 4,947,057 A | 8/1990 | Czarnocki et al. | |
| 5,756,999 A | 5/1998 | Parrish et al. | |
| 6,028,309 A | 2/2000 | Parrish et al. | |
| 6,316,777 B1 | 11/2001 | Parrish et al. | |
| 6,359,460 B1 | 3/2002 | Tanaka | |
| 6,465,798 B1 | 10/2002 | Hoelter et al. | |
| 6,696,884 B1 * | 2/2004 | Seven | ............ 327/540 |
| 6,730,909 B2 | 5/2004 | Butler | |
| 6,812,465 B2 | 11/2004 | Parrish et al. | |
| 7,034,301 B2 | 4/2006 | Parrish et al. | |
| 7,423,458 B2 * | 9/2008 | Aghtar | ............ 327/91 |
| 2002/0022938 A1 | 2/2002 | Butler | |
| 2002/0166968 A1 | 11/2002 | Bradley | |
| 2003/0090316 A1 * | 5/2003 | Dathe et al. | ............ 327/554 |
| 2003/0213910 A1 | 11/2003 | Anderson et al. | |
| 2009/0014653 A1 | 1/2009 | Parrish | |
| 2009/0074120 A1 * | 3/2009 | Toosky et al. | ............ 375/350 |

FOREIGN PATENT DOCUMENTS

| | | |
|---|---|---|
| JP | 2000-114467 | 4/2000 |
| WO | WO 2007015235 | 2/2007 |

\* cited by examiner

*Primary Examiner* — David Porta
*Assistant Examiner* — Yara Green
(74) *Attorney, Agent, or Firm* — Haynes and Boone, LLP (57) ABSTRACT

Techniques are disclosed to provide a reference signal via a switched capacitor filter for image detector arrays in accordance with one or more embodiments. For an example embodiment, a method of providing a sampled and filtered reference signal to an image detector array includes receiving a reference signal; sampling the reference signal with a first capacitor to store a sampled reference signal based on the reference signal; coupling a second capacitor to the first capacitor to share charge stored on the first and second capacitors to generate the sampled and filtered reference signal to store on the second capacitor; and decoupling the second capacitor from the first capacitor, wherein the sampled and filtered reference signal is stored on the second capacitor to provide for one or more image detectors within the image detector array.

14 Claims, 10 Drawing Sheets

SWITCHED CAPACITOR FILTER SYSTEMS AND METHODS

TECHNICAL FIELD

One or more embodiments of the invention relate generally to image detectors and, more particularly for example, to a switched capacitor filter for image detector applications.

BACKGROUND

There are a wide variety of image detectors, such as visible image detectors, infrared image detectors, or other types of image detectors that are typically provided within an image detector array to capture an image to store or to display. As an example, a microbolometer, which detects infrared radiation, is a well known type of image detector. Modern microbolometer structures are typically fabricated on monolithic silicon substrates to form an image detector array of microbolometers, with each microbolometer functioning as a pixel to produce a two-dimensional image. The change in resistance of each microbolometer is translated into a time-multiplexed electrical signal by circuitry known as the read out integrated circuit (ROIC). The combination of the ROIC and the microbolometer array (or image detector array) is commonly known as a microbolometer focal plane array (FPA) or microbolometer infrared FPA.

A typical image detector array requires a stable voltage reference signal, with minimal noise, to produce a high-quality image. However, a conventional voltage reference signal generator may provide a voltage reference signal that includes a high-frequency noise component and/or noise that varies from row to row within the detector array. These types of noise components are difficult to remove from the output signal of the image detector array and thus may limit the overall performance of the image detector array. As a result, there is a need for improved techniques to provide reference signals for an image detector array.

SUMMARY

Switched capacitor filter systems and methods are disclosed herein in accordance with one or more embodiments of the invention. For example for one or more embodiments, systems and methods are disclosed to provide a reference signal via a switched capacitor filter for image detector arrays, such as for example for a microbolometer FPA or other type of electro-optical sensor array.

More specifically in accordance with one embodiment, an image detector system includes a plurality of image detectors configured to form an image detector array; and a switched capacitor filter configured to receive a reference signal and provide a sampled and filtered reference signal for one or more of the image detectors, wherein the switched capacitor filter includes a first switch configured to receive the reference signal; a first capacitor, having a first terminal coupled to the first switch and a second terminal coupled to a reference voltage, configured to sample the reference signal if the first switch is closed to store a sampled reference signal; a second switch having a first switch terminal and a second switch terminal, with the first switch terminal coupled to the first terminal of the first capacitor; and a second capacitor, having a first terminal coupled to the second switch terminal and a second terminal coupled to a second reference voltage, configured to couple to the first capacitor to share charge with the first capacitor based on the sampled reference signal if the first switch is open and the second switch is closed to store the sampled and filtered reference signal to provide for the one or more image detectors.

In accordance with another embodiment, an image detector system includes an image detector; a switched capacitor filter configured to receive a reference signal and provide a sampled and filtered reference signal for the image detector, wherein the switched capacitor filter includes a first switch, having a first switch terminal and a second switch terminal, configured to receive the reference signal at the first switch terminal; a first capacitor, having a first terminal coupled to the second switch terminal and a second terminal coupled to a reference voltage, configured to sample the reference signal provided via the first switch and store a sampled reference signal; a second switch having a third switch terminal and a fourth switch terminal, with the third switch terminal coupled to the first terminal of the first capacitor; and a second capacitor, having a first terminal coupled to the fourth switch terminal and a second terminal coupled to a second reference voltage, configured to be connected to the first capacitor by the second switch, with the first switch open, to store the sampled and filtered reference signal, wherein with the second switch open the sampled and filtered reference signal is provided by the second capacitor for the image detector.

In accordance with another embodiment, a method of providing a sampled and filtered reference signal to an image detector array includes receiving a reference signal; sampling the reference signal with a first capacitor to store a sampled reference signal based on the reference signal; coupling a second capacitor to the first capacitor to share charge stored on the first and second capacitors to generate the sampled and filtered reference signal to store on the second capacitor; and decoupling the second capacitor from the first capacitor, wherein the sampled and filtered reference signal is stored on the second capacitor to provide for one or more image detectors within the image detector array.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Switched capacitor filter systems and methods are disclosed herein in accordance with one or more embodiments. For example for one or more embodiments, systems and methods are disclosed to provide a reference signal via a switched capacitor filter for image detector arrays, such as for example for a microbolometer FPA as discussed further herein. However, it should be understood that the switched capacitor filter techniques disclosed herein are not limited to microbolometer FPAs, but rather the switched capacitor filter techniques disclosed herein may be applied to a wide variety of image detector applications, including other types of electro-optical sensor arrays, as would be understood by one skilled in the art.

Figure 1:
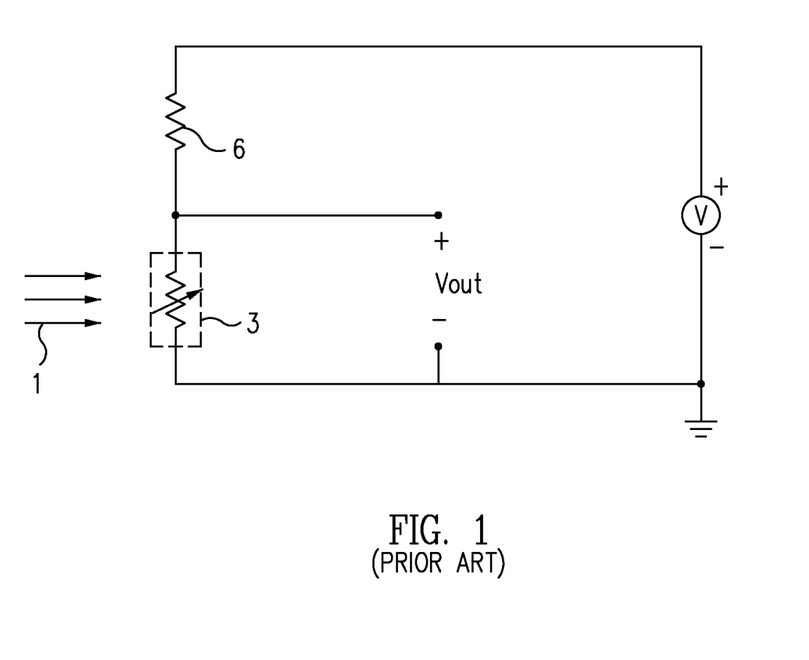
FIG. 1 shows a circuit diagram illustrating a conventional circuit for measuring microbolometer resistance.

FIG. 1 illustrates a conventional method for measuring microbolometer resistance. A voltage (V) is applied across the series combination of a microbolometer 3 and a resistive load ($R_{load}$) 6. Microbolometer 3 (also referred to as the active microbolometer) is thermally isolated from the substrate and receives incident infrared radiation 1, while resistive load ($R_{load}$) 6, which may also be a microbolometer (also referred to as the load microbolometer), is thermally shorted to the substrate.

An output voltage ($V_{out}$) is measured across microbolometer 3 to determine its resistance ($R_{bolometer}$), according to the following equation (1).

$$R_{bolometer} = R_{load}/(V/V_{out} - 1) \quad (1)$$

Figure 2:
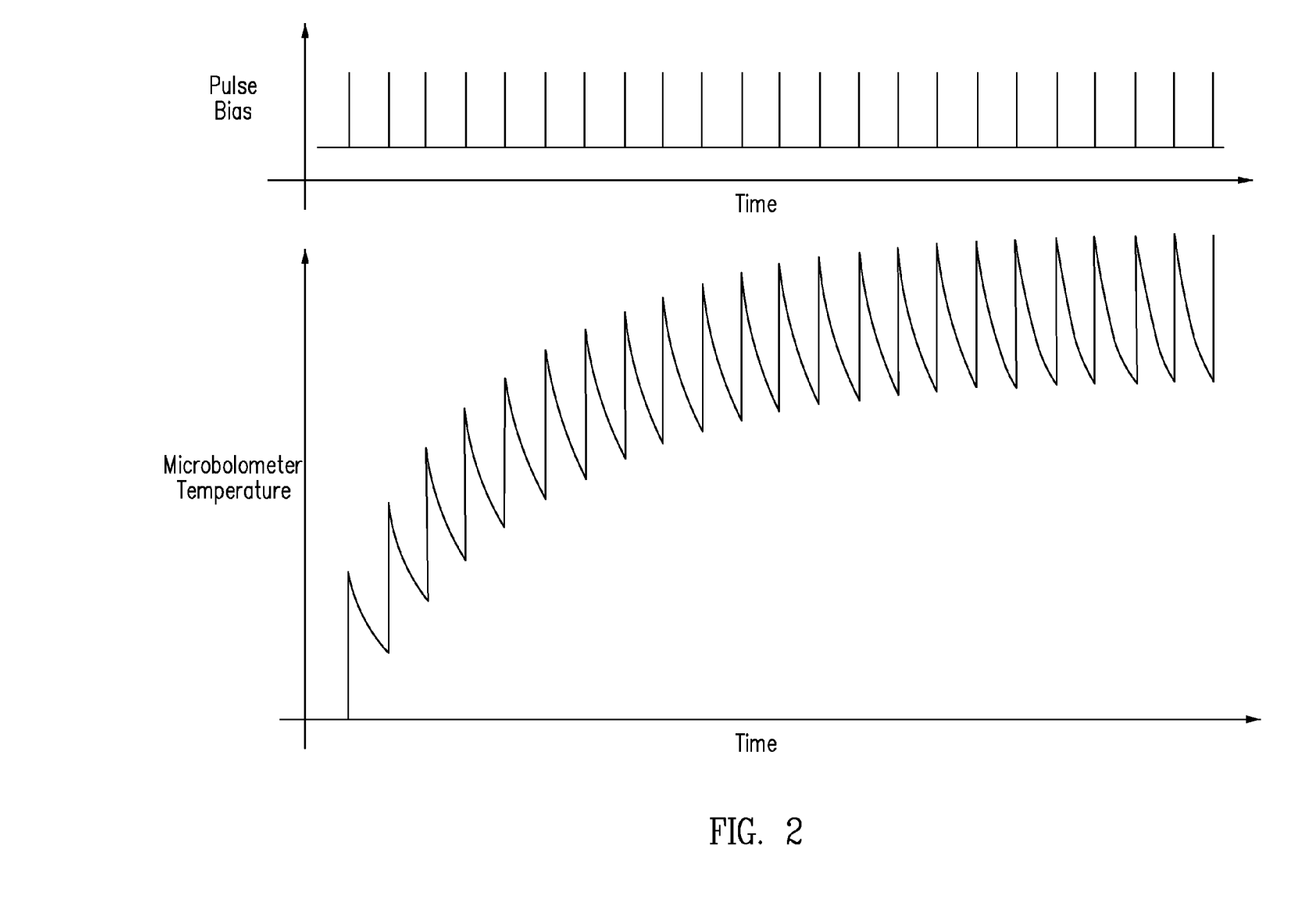
FIG. 2 shows a graph of microbolometer temperature over many sample periods.

The temperature rise in microbolometer 3 due to self-heating generally is significantly larger than the temperature rise resulting from the incident infrared radiation. If the voltage (V) is multiplexed or periodically applied during each sample period, the self-heating behavior may be as shown in FIG. 2. The microbolometer temperature rises significantly during each sample period (also referred to as a bias period and indicated by a pulse bias spike in FIG. 2).

Figure 3:
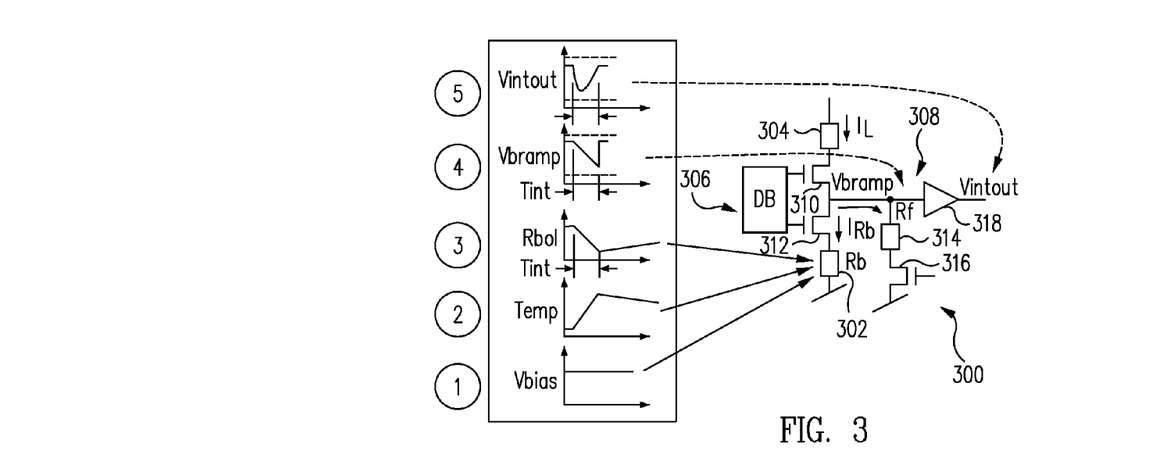
FIG. 3 shows a circuit diagram for illustrating microbolometer heating issues in accordance with one or more embodiments.

One drawback of this characteristic is that the pulse bias heating may limit the available output signal range (or output signal swing) associated with microbolometer 3, which thus may limit the performance of the microbolometer FPA. For example, FIG. 3 shows a circuit 300 for illustrating microbolometer heating issues in accordance with one or more embodiments. However, it should be understood that circuit 300 represents an implementation example of microbolometer circuitry (e.g., a unit cell of a microbolometer array and possibly a portion of the ROIC), but is not limiting as the techniques disclosed herein are applicable to various types of microbolometer circuit implementations as would be understood by one skilled in the art. Further details regarding microbolometer circuits and FPAs may be found, for example, in U.S. Pat. Nos. 5,756,999, 6,028,309, 6,812,465, and 7,034,301.

Circuit 300 includes a microbolometer 302 (e.g., an active microbolometer labeled Rb) and may also include detector bias circuitry 306 and output circuitry 308. Detector bias circuitry 306 may include a resistive load 304 (e.g., a load microbolometer), transistors 310 and 312, and circuitry to bias transistors 310 and 312 (e.g., digital-to-analog converters). Output circuitry 308 may include an output amplifier 318 (e.g., an integrating amplifier or an output driver buffer) and may further include a resistor 314 and a transistor 316 coupled at an input (e.g., a node labeled Rf and referred to herein as Rf node) to amplifier 318. It should be understood that various types of bias circuits and output circuits may be implemented in accordance with techniques disclosed herein and that detector bias circuitry 306 and output circuitry 308 are simply example implementations.

For this example, a load current ($I_L$) is provided through resistive load 304, with transistors 310 and 312 controlled to provide a microbolometer bias current ($I_{RB}$) through microbolometer 302. In terms of general operation, a number of graphs (1 through 5) are shown of circuit parameters (e.g., voltage, temperature, or resistance) versus time as examples in FIG. 3 to illustrate certain heating issues (e.g., pulsed bias heating) associated generally with microbolometer circuitry.

Specifically, a bias voltage applied during biasing of microbolometer 302 (graph 1, Vbias) dissipates power across microbolometer 302, which results in microbolometer 302 heating up (graph 2, temperature (Temp) increases) based on various factors (e.g., bias applied, microbolometer resistance, and thermal mass). The resistance (graph 3, Rbol) of microbolometer 302 decreases as the temperature increases over a detection integration time interval (Tint). A dynamically changing current creates a dynamically changing voltage across resistor 314, which approximates a ramp (or sloped line, graph 4, Vbramp) that consumes available signal headroom at integrator input (the Rf node) of amplifier 318 (i.e., pulsed bias heating causes an input ramp to the integrator represented by amplifier 318). This bias induced ramp (Vbramp) is integrated resulting in a curved waveform (e.g., a distorted waveform, which may approximate a parabola) at the integrator output (Vintout) of amplifier 318 (graph 5, Vintout). Thus, the curved waveform due purely to pulsed bias heating of microbolometer 302 reduces available integrator output signal swing of amplifier 318.

Figure 4:
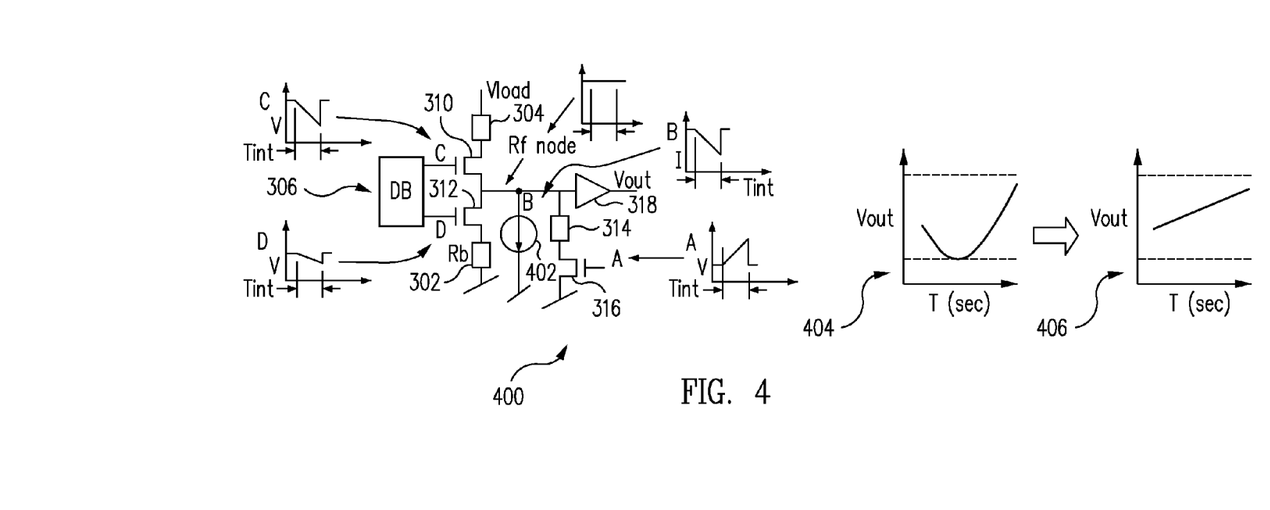
FIG. 4 shows a circuit diagram for illustrating microbolometer heating temperature compensation techniques in accordance with one or more embodiments.

Accordingly in accordance with one or more embodiments, techniques are disclosed to provide systems and methods to compensate for pulse bias heating of a microbolometer. For example, FIG. 4 shows a circuit 400 for illustrating microbolometer heating temperature compensation techniques in accordance with one or more embodiments. Circuit 400 is similar to circuit 300 (FIG. 3), but includes an optional current source 402 at the Rf node and graphically illustrates compensation techniques (also referred to herein as anti-ramp techniques) directed to pulsed bias heating.

In general, circuit 400 illustrates techniques to introduce a voltage and/or current ramp to compensate for and possibly remove the pulsed bias induced microbolometer ramp voltage provided to amplifier 318. For example, an anti-ramp bias voltage and/or current may be provided at one or more various locations designated with letters A, B, C, and D and having associated examples of graphs versus time of voltage (at A, C, and D) or current (at B) to be applied to provide the desired pulsed bias heating compensation.

For example, location A designates a varying voltage (e.g., a digitally selectable offset value, such as with a digital-to-analog converter) at a gate of transistor 316 as shown in an associated graph A (FIG. 4). Location B designates a variable current via current source 402 at the RF node as shown in an associated graph B. Location C designates a varying voltage (e.g., a digitally selectable offset value, such as with a digital-to-analog converter) at a gate of transistor 310 to vary the load bias as shown in an associated graph C. Location D designates a varying voltage (e.g., a digitally selectable offset value, such as with a digital-to-analog converter) at a gate of transistor 312 to vary the detector bias as shown in an associated graph D. The compensation applied at locations A, B, C, and/or D may be as desired to provide a compensated signal (e.g., a flattened output voltage response) at the Rf node, such as shown in an associated Rf node graph. Consequently, rather than an output signal (Vout) of amplifier 318 as illustrated in a graph 404, the output signal (Vout) of amplifier 318 may be a compensated output signal as illustrated in a graph 406 due to the application of an anti-ramp bias applied, for example, at locations A, B, C, and/or D.

In general, the compensation techniques illustrated in FIG. 4 may be applied generally or may be associated with microbolometer temperature data. For example as would be understood by one skilled in the art, after calibration of the microbolometer FPA (e.g., the infrared camera), the optimal anti-ramp adjustment value (e.g., a time-varying value and/or initial and final values to provide a desired ramp or slope) applied at locations A, B, C, and/or D) may be selected from a table of values or otherwise determined based on infrared detector (e.g., microbolometer FPA) temperature data.

Figure 5:
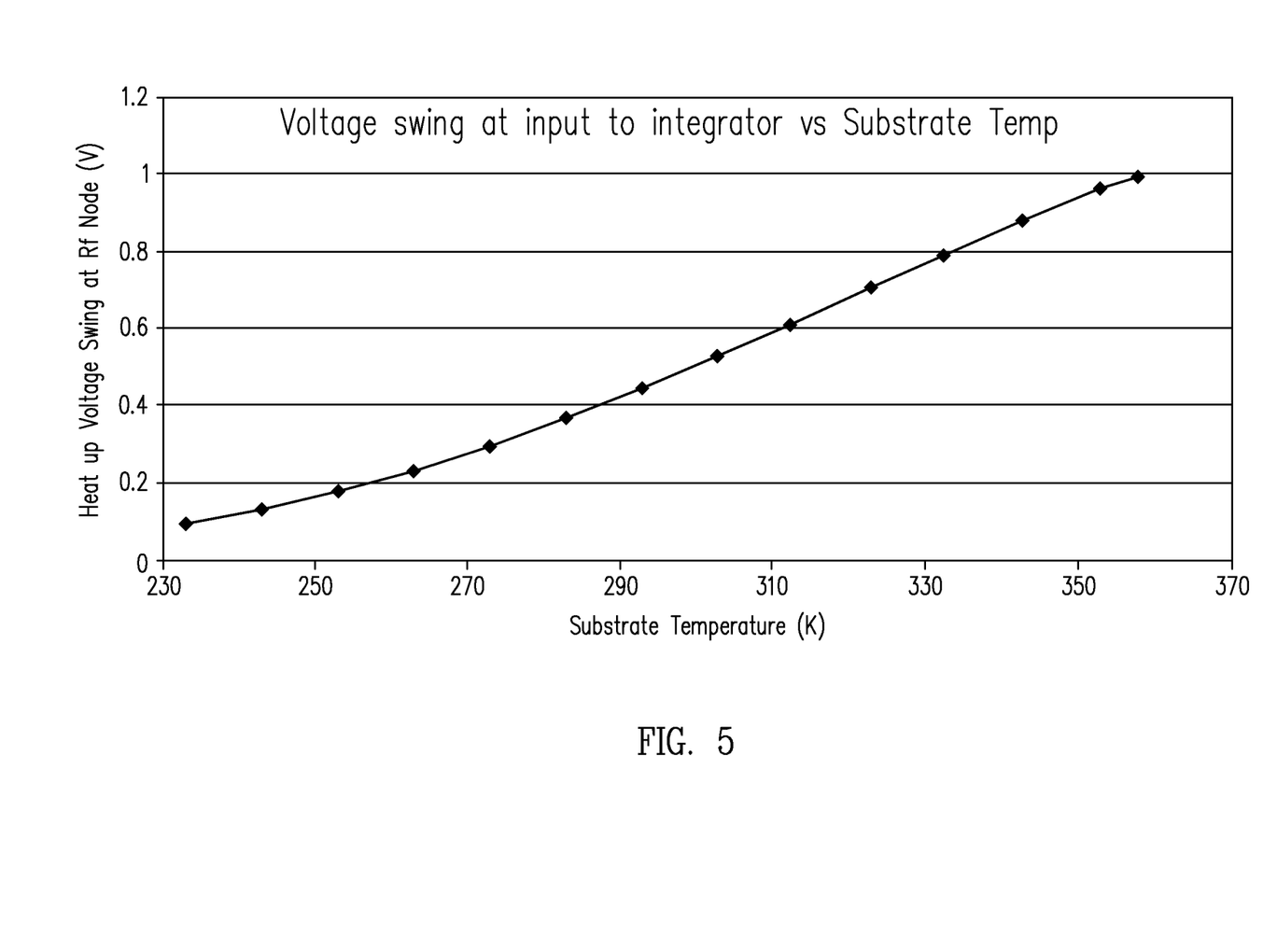
FIG. 5 shows a graph of voltage swing versus substrate temperature for microbolometer heating temperature compensation techniques in accordance with one or more embodiments.

For example as shown in the exemplary graph of voltage versus temperature in FIG. 5, the voltage swing at the Rf node may vary with a substrate temperature associated with the microbolometer (e.g., from 0.1 V to 1.0 V). Therefore, the anti-ramp adjustment value (e.g., ramp or slope values) may be selected based on the substrate temperature or may not be applied, for example, if the substrate temperature is sufficiently low (e.g., depending upon the specific application requirements). Furthermore, which location(s) to select to apply anti-ramp compensation values for a desired application may depend on various factors, such as overall complexity, uniformity, noise, area, power, performance, or other specific requirements for the desired application.

Figure 6A:
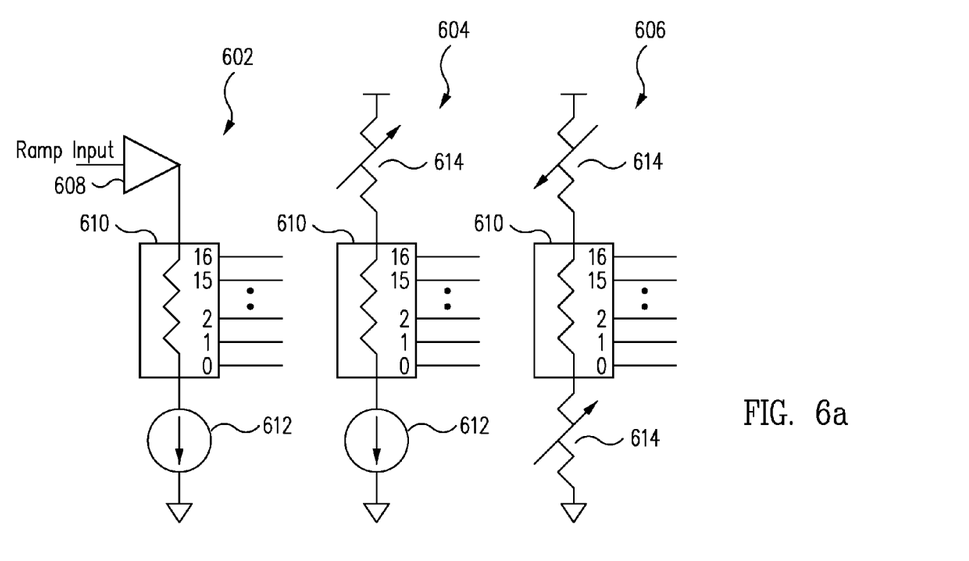
FIGS. 6a and 6b show circuit diagrams illustrating implementation examples for providing microbolometer heating compensation values in accordance with one or more embodiments.
Figure 6B:
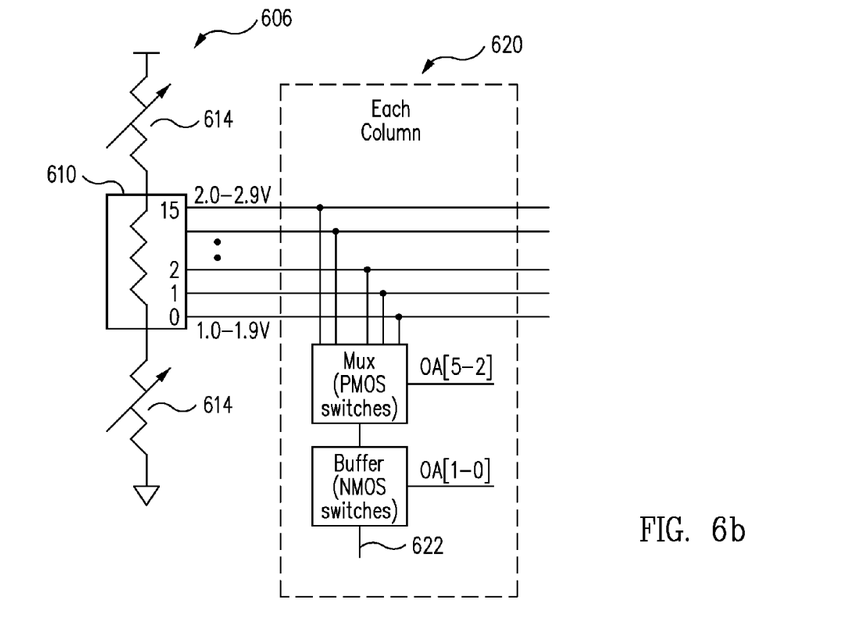

FIGS. 6a and 6b show circuit diagrams illustrating implementation examples for providing microbolometer heating compensation values in accordance with one or more embodiments. Specifically, FIG. 6a illustrates three examples of circuit implementations (e.g., circuits 602, 604, and 606) for providing a selectable ramped voltage that may be used to compensate for the microbolometer pulse-biased heating ramp.

For example, circuit 602 includes a voltage buffer 608, which receives a ramp input voltage (e.g., having values determined to provide anti-ramp compensation techniques), a resistor string 610 (e.g., resistor divider) for providing a number of selectable voltage level taps, and a current source 612 to provide a fixed and/or variable current. As further examples, circuit 604 includes a variable resistor 614 along with the resistor string 610 and current source 612, while circuit 606 includes resistor string 610 and variable resistors 614. A desired ramp voltage may be obtained by varying the ramp input voltage (e.g., circuit 602), varying the resistance of variable resistors 614, varying the current of current source 612 (if not a fixed current source), and/or selecting from the selectable voltage level taps of resistor string 610.

As a specific example, resistor string 610 may represent a series of resistors with a selectable voltage level tap provided between resistors in the series or alternatively may represent any type of resistor divider or resistor ladder configuration providing selectable voltage level taps. As further specific examples, current source 612 and variable resistor 614 may represent a digitally controlled current source (e.g., a current digital-to-analog converter (DAC)) and a digitally controlled resistor (e.g., a resistor DAC), respectively. It should be noted that an arrow on variable resistor 614 indicates that it is a variable resistor (e.g., a potentiometer, such as a digitally controlled resistor), which may be controlled by a control signal (e.g., provided by a processor located on or off the integrated circuit containing variable resistor 614).

Current source 612 and/or variable resistor 614, for example, may be varied over discrete steps (e.g., after certain number of clock cycles) during an active microbolometer's integration period to generate a stepped ramped voltage to approximate a desired anti-ramp signal. Variable resistor 614 may be alternatively implemented, for example, as a plurality of resistors in series and/or parallel configurations which are selectable (e.g., via switches) to obtain a desired resistance or may be implemented in various conventional variable resistor implementations.

As an example, FIG. 6b illustrates circuit 606 providing selectable voltage taps (e.g., globally for a portion of a sensor array) that may be selected by a circuit 620, which may include various circuitry (e.g., a multiplexer and a buffer controlled by control signals OA) to select and provide a desired output signal on an output path 622. Circuit 620 may be provided, for example, on a per microbolometer or a per column basis (e.g., columns within a microbolometer array) to provide the desired output signals on output paths 622 to the associated microbolometers.

As a specific example, the output signal on output path 622 may be varied to provide a desired anti-ramp compensation by varying variable resistors 614 during the active microbolometer's integration period. For example, variable resistor 614 (above resistor string 610) may have a stepped, decreasing resistance value, while variable resistor 614 (below resistor string 610) may have a corresponding stepped, increasing resistance value to provide a resulting ramped voltage (e.g., as illustrated in FIG. 4) at the selectable voltage level taps of resistor string 610.

The output signal (e.g., a signal voltage plus a 1.0 V ramp voltage range) on output path 622 may be provided, for example, as shown in FIG. 4 to the gate of transistor 316 (location A), the gate of transistor 310 (location C), the gate of transistor 312 (location D), or used to control current source 402 (location B). Thus for example by using the techniques disclosed herein, compensation may be provided to compensate for the heating of microbolometer 302 (e.g., pulse bias heating).

Figure 7:
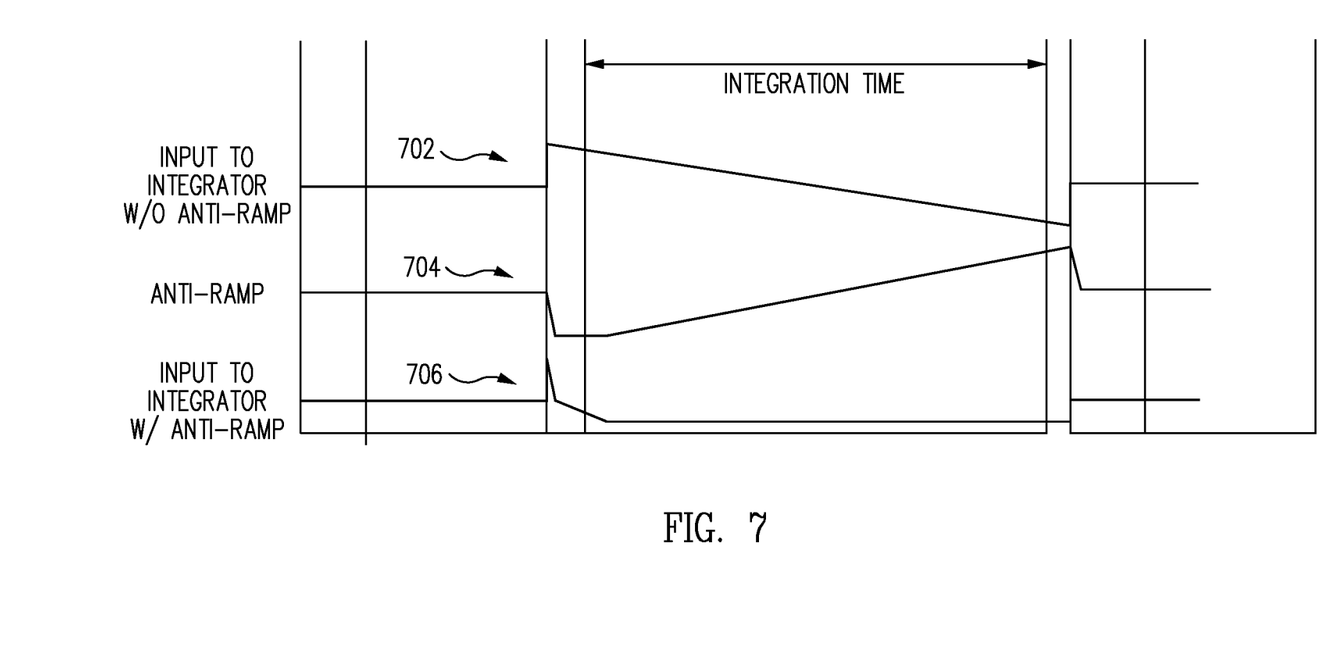
FIG. 7 shows a timing diagram example for microbolometer heating temperature compensation techniques in accordance with one or more embodiments.

As an example, FIG. 7 shows a timing diagram example for microbolometer heating temperature compensation techniques in accordance with one or more embodiments. Specifically, FIG. 7 in reference to FIG. 4 illustrates an example signal waveform 702 over an integration time (e.g., Tint) representing an input signal to the integrator (e.g., amplifier 318) without anti-ramp compensation, that is without the application of one or more heating compensation techniques disclosed herein. A signal waveform 704 illustrates an example heating compensation waveform (anti-ramp) to provide compensation for signal waveform 702, such as would be applied for example at location A (FIG. 4). A signal waveform 706 represents a resulting input signal to the integrator with the application of signal waveform 704 to provide heating compensation (e.g., anti-ramp compensation).

Thus for example, by proper application of a microbolometer heating compensation signal (anti-ramp), such as with proper selection of values to provide a required slope for a given application and requirements, an active microbolometer output signal may be compensated to reduce microbolometer heating distortions (e.g., due to pulsed bias induced heating). The microbolometer heating compensation signal may further be determined based on microbolometer temperature (e.g., substrate temperature), with the proper values selected for example based on a formula or a table of values corresponding to various temperature ranges for a particular system (e.g., an infrared camera) as would be understood by one skilled in the art.

Figure 8A:
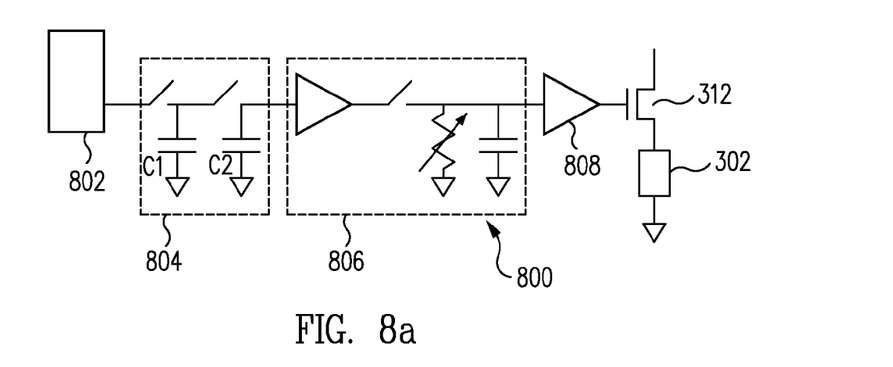
FIGS. 8a-8c show circuit diagrams illustrating implementation examples for providing microbolometer heating compensation values in accordance with one or more embodiments.
Figure 8B:
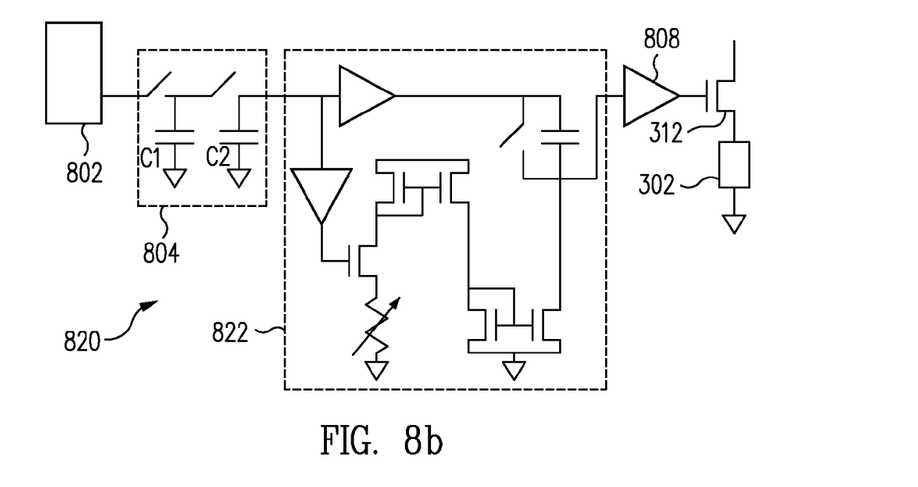
Figure 8C:
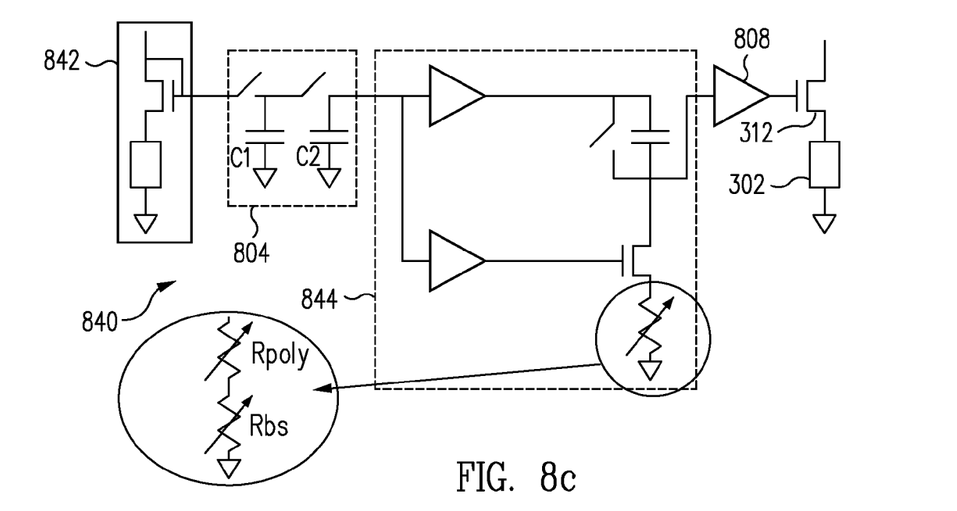

FIGS. 8a-8c show circuit diagrams illustrating additional implementation examples for providing microbolometer heating compensation values in accordance with one or more embodiments. Specifically, FIGS. 8a-8c illustrate three examples of corresponding circuit implementations (e.g., circuits 800, 820, and 840, respectively) for providing a selectable ramped voltage that may be used to compensate for the microbolometer pulse-biased heating ramp, such as in these examples provided for example to location D (FIG. 4).

For example, circuit 800 includes detector bias circuit 802 (e.g., digital-to-analog converter) to provide a bias signal via a filter 804, an anti-ramp circuit 806, and a buffer 808 to bias the gate of transistor 312. Detector bias circuit 802, buffer 808, and transistor 312 may represent an implementation example of a portion of detector bias circuitry 306 (FIG. 3). Filter 804 may represent a switched capacitor filter, while anti-ramp circuit 806 provides a buffered resistor-capacitor network to generate a desired ramp signal (anti-ramp) for biasing via buffer 808 the gate of transistor 312 and compensating for the pulse-biased heating ramp associated with microbolometer 302. A variable resistor (e.g., a resistor DAC) within anti-ramp circuit 806 may be selectively set (e.g., fixed) during the integration time of microbolometer 302, with a desired anti-ramp signal provided based upon a setting of a desired value for the variable resistor within anti-ramp circuit 806.

Circuit 820, as another example, includes detector bias circuit 802, filter 804, an anti-ramp circuit 822, and buffer 808 to bias the gate of transistor 312. Anti-ramp circuit 822 provides a buffered variable resistor, transistor, capacitor network, with current mirrors, to generate a desired ramp signal (anti-ramp) for biasing via buffer 808 the gate of transistor 312 and compensating for the pulse-biased heating ramp associated with microbolometer 302. The buffered variable resistor (e.g., a resistor DAC) within anti-ramp circuit 822 may be selectively set (e.g., fixed) during the integration time of microbolometer 302, with a desired anti-ramp signal provided based upon a setting of a desired value for the variable resistor within anti-ramp circuit 822.

Circuit 840, as another example, includes a detector bias circuit 842, filter 804, an anti-ramp circuit 844, and buffer 808 to bias the gate of transistor 312. Detector bias circuit 842 may represent a portion of detector bias circuit 802 and provides an example circuit implementation of a transistor and a resistor (e.g., a load microbolometer). Anti-ramp circuit 844 provides a buffered variable resistor, transistor, and capacitor network to generate a desired ramp signal (anti-ramp) for biasing via buffer 808 the gate of transistor 312 and compensating for the pulse-biased heating ramp associated with microbolometer 302. The buffered variable resistor (e.g., a resistor DAC) within anti-ramp circuit 844 may be selectively set (e.g., fixed) during the integration time of microbolometer 302, with a desired anti-ramp signal provided based upon a setting of a desired value for the variable resistor within anti-ramp circuit 844.

The variable resistor of anti-ramp circuit 844 may be implemented, for example, as a variable (e.g., programmable) polysilicon resistor (Rpoly) and a variable (e.g., programmable) shunted microbolometer (Rbs, e.g., a load microbolometer that may be thermally shorted or shunted to the substrate, with the arrows indicating adjustability), which may be selected to optimize the anti-ramp signal over temperature (e.g., similar temperature coefficient of resistance relative to active microbolometer 302). Similarly, the buffered variable resistors of anti-ramp circuits 806 and 822 may be implemented with polysilicon resistors or with a combination of polysilicon resistors and shunted microbolometers, depending upon a desired application and requirements.

A shunted microbolometer may be selected, for example, to provide additional compensation to counter the self-heating properties of active microbolometer 302. For example by independently adjusting the Rpoly resistor's resistance and the shunted microbolometer's resistance, a temperature dependent ramp voltage may be provided that nulls the undesirable pulsed bias induced voltage swing at an input to the integrator over a wide temperature range (e.g., as discussed in reference to FIGS. 3 and 4).

In general, it should be understood that circuits 800, 820, and 840 are example implementations, with given timing and reset switches depending upon a given application. However, these are not limiting and various other implementations would be suitable for a given application and requirements as would be understood by one skilled in the art.

Filter 804 may be implemented as a switched capacitor filter as shown in FIGS. 8a-8c, which may provide certain benefits. For example, filter 804 may reduce noise (e.g., high frequency noise) on the bias signal provided for the microbolometer focal plane array. The noise component on the bias signal may degrade infrared image quality (e.g., noise transferred from the bias signal to the output signal to some degree) and therefore, by reducing this noise component on the bias signal, infrared image quality may be improved. As illustrated in FIGS. 8a-8c, the switched capacitor filter may be implemented to reduce noise on the anti-ramp bias (e.g., for location D), but may be implemented in a more general fashion to provide a filtered and sampled bias signal with a reduced noise component.

Figure 9A:
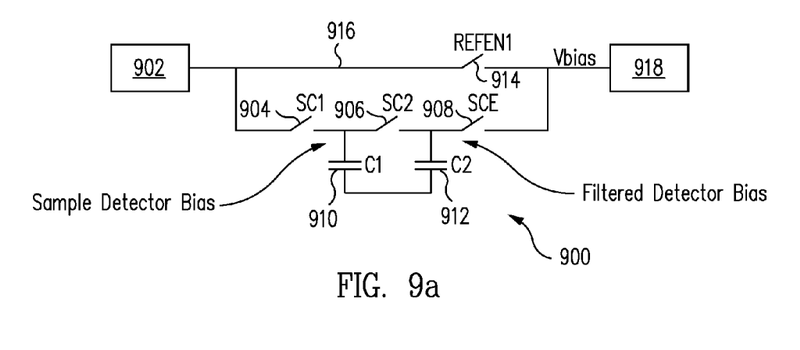
FIG. 9a shows a circuit diagram illustrating an implementation example for providing a filtered bias signal in accordance with one or more embodiments.

For example, the switched capacitor filter may be implemented to provide a sampled and filtered bias signal for any type of image detector (e.g., visible sensors, infrared sensors, or other types of electro-optical sensors). As a specific implementation example, FIG. 9a shows a circuit 900 illustrating an implementation example for providing a filtered bias signal (switched capacitor detector bias signal) in accordance with one or more embodiments.

Circuit 900 includes a bias generator 902 (e.g., a voltage source such as a power supply rail, a digital-to-analog converter, a buffer, or any other type of voltage source) to provide a voltage reference signal that will be sampled and filtered by capacitors 910 and 912 to provide an output signal Vbias via an optional buffer 918 (e.g., unity gain buffer and/or may further represent at least a portion of an associated electro-optical sensor array). The output signal Vbias (e.g., a voltage reference signal), for example, may be used on a per pixel, on a per row (i.e., row or column), or for multiple pixels or rows of an electro-optical sensor array, depending upon the size of capacitors 910 and 912 and the particular application and requirements. Capacitor 912, for example, may be much larger (e.g., 200 times) than the size of capacitor 910.

Circuit 900 may operate on a per frame or a multiple frame basis, with capacitors 910 and 912 providing the output signal Vbias as a stable voltage source to the electro-optical sensor array during the frame or multiple frame period. Typically, bias generator 902 provides a bias signal with a certain noise component, which results in row-to-row noise signal differences provided to the electro-optical sensor array. However with the addition of the switched capacitor filter (e.g., as shown in FIG. 9a or discussed in reference to filter 804 of FIGS. 8a-8c), a more stable, noise free signal may be provided to the electro-optical sensor array. Consequently, row-to-row noise differences may be greatly reduced, which may improve image quality and may change row reference noise components to frame reference noise components that may be more easily compensated for with signal processing, reference rows to remove noise or offset, or other techniques as would be understood by one skilled in the art.

Circuit 900 includes an optional direct path 916, with a switch 914 controlled by a signal REFEN1, to provide the voltage reference signal from bias generator 902 as the output signal Vbias. Direct path 916 may be used, for example, to bypass the switched capacitor filter path (e.g., capacitors 910 and 912 and associated switches 904 and 906, with switch 908 open) for certain applications. Alternatively, direct path 916 may be used to assist in the pre-charge of capacitor 912 (e.g., during an initial frame period of the electro-optical sensor array at start-up) prior to deselecting switch 914 and using the switched capacitor filter path solely to provide the output signal Vbias during normal operation (e.g., after initial start-up period).

Figure 9B:
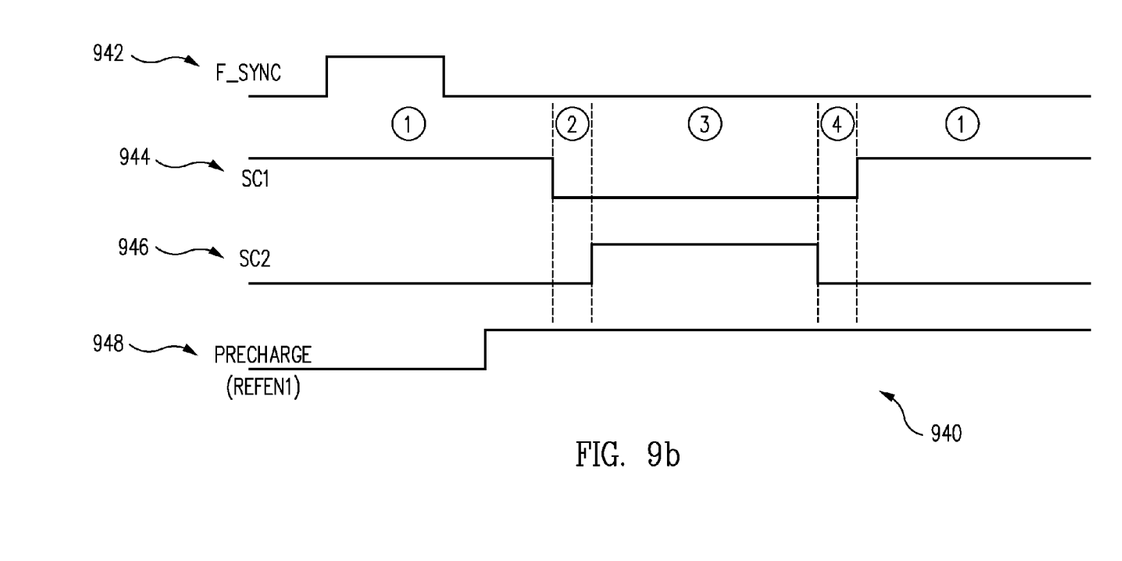
FIG. 9b shows a timing diagram example illustrating an implementation example for providing a filtered bias signal in accordance with one or more embodiments.

As an example, FIG. 9b shows a timing diagram 940 illustrating an example for providing a filtered bias signal in accordance with one or more embodiments. For example, timing diagram 940 may be applicable to show an example of general operation for filter 840 of FIGS. 8a-8c or for circuit 900 of FIG. 9a.

In terms of general timing operation, a sync waveform 942 represents a synchronization signal, which may represent a frame or multiple frame synchronization signal. As shown at a state 1, an SC1 waveform 944 (e.g., a control signal for switch 904, such as a transistor) is asserted to close switch 904 and allow capacitor 910 (C1) to sample the voltage reference signal (e.g., detector bias) from bias generator 902. At a state 2, SC1 waveform 944 is de-asserted to open switch 904 (with the sampled detector bias signal stored on capacitor 910) prior to a state 3 during which an SC2 waveform 946 (e.g., a control signal for switch 906, such as a transistor) is asserted to close switch 906 and allow the charge to be shared between capacitors 910 (C1) and 912 (C2). At a state 4, SC2 waveform 946 is de-asserted prior to SC1 waveform 944 being reasserted. The process may be repeated, as shown, starting again at state 1.

At state 4, capacitor 912 is charged and ready to provide a sampled and filtered bias signal, such as for example for any type of image detector on a frame or multiple frame basis for one or more pixels or rows for the desired application. As a specific example for filter 804 (FIGS. 8a-8c), a capacitor C2 (e.g., capacitor 912) may be charged as discussed in reference to timing diagram 940 to provide a sampled and filtered bias signal to anti-ramp circuit 806, 822, or 844. This process as illustrated in timing diagram 940 may be repeated as desired for a given application or requirements as would be understood by one skilled in the art. Thus with proper operation of switches 904 and 906, capacitor 910 may be used to sample a detector bias signal and transfer the sampled detector bias signal to capacitor 912 to provide the sampled and filtered bias signal having a reduced noise component relative to the detector bias signal being sampled by capacitor 910.

In reference to FIG. 9a, switch 908 may be optional and controlled by a control signal SCE to isolate and prevent capacitor 912 from providing the bias signal, if desired. For example, if optional direct path 916 is included and used to provide the voltage reference signal from bias generator 902 as the output signal Vbias, then control signal SCE may be de-asserted to open switch 908. Alternatively, switch 908 may generally remain closed and, as shown in FIG. 9b for an example pre-charge waveform 948 (e.g., control signal REFEN1), switch 914 (and optionally also switches 904 and 906) may be closed initially upon startup (e.g., for one or more frames) to quickly pre-charge capacitor 912 and optionally capacitor 910 also if switch 904 or switch 906 or both are closed.

Figure 10A:
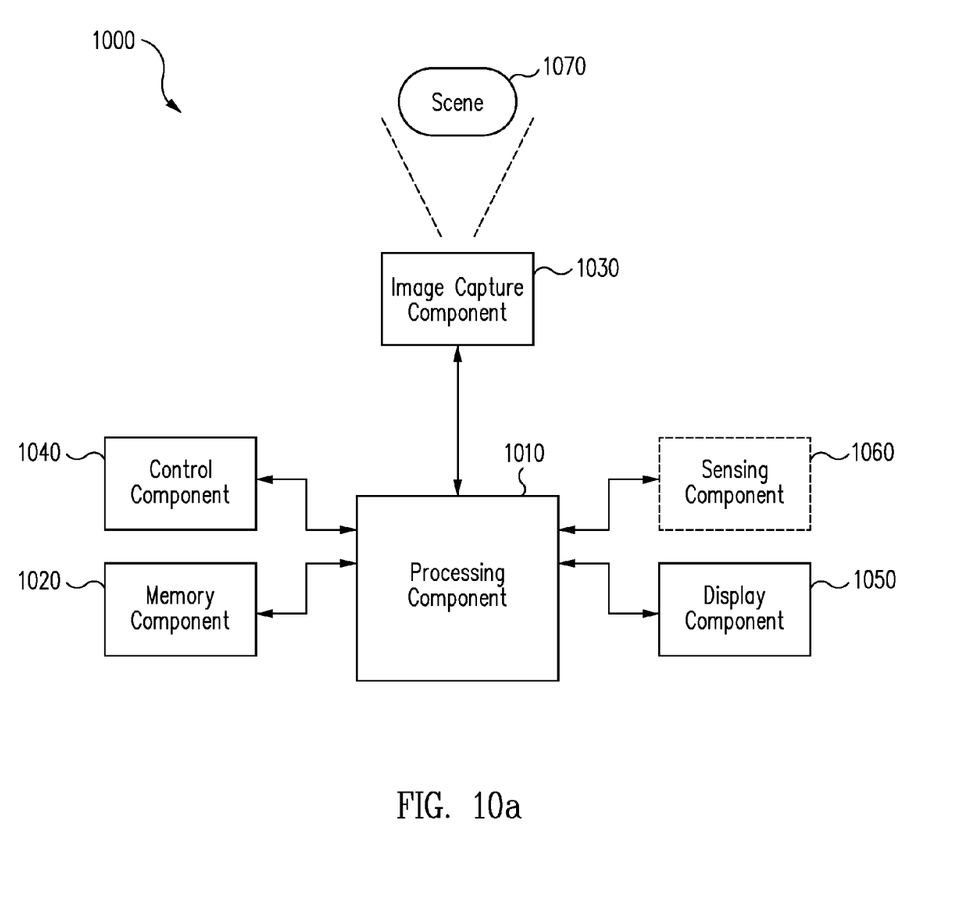
FIG. 10a shows a block diagram illustrating a sensor system in accordance with one or more embodiments.

FIG. 10a shows a block diagram illustrating a system 1000 (e.g., an infrared camera) for capturing images and processing in accordance with one or more embodiments. System 1000 comprises, in one implementation, a processing component 1010, a memory component 1020, an image capture component 1030, a control component 1040, and a display component 1050. Optionally, system 1000 may include a sensing component 1060.

System 1000 may represent for example an infrared imaging device, such as an infrared camera, to capture and process images, such as video images of a scene 1070. The system 1000 may represent any type of infrared camera adapted to detect infrared radiation and provide representative data and information (e.g., infrared image data of a scene) or may represent more generally any type of electro-optical sensor system. System 1000 may comprise a portable device and may be incorporated, e.g., into a vehicle (e.g., an automobile or other type of land-based vehicle, an aircraft, or a spacecraft) or a non-mobile installation requiring infrared images to be stored and/or displayed or may comprise a distributed networked system.

In various embodiments, processing component 1010 may comprise any type of a processor or a logic device (e.g., a programmable logic device (PLD) configured to perform processing functions). Processing component 1010 may be adapted to interface and communicate with components 1020, 1030, 1040, and 1050 to perform method and processing steps and/or operations, as described herein such as controlling biasing and other functions (e.g., values for elements such as variable resistors and current sources, switch settings for timing such as for switched capacitor filters, ramp voltage values, etc.) along with conventional system processing functions as would be understood by one skilled in the art.

Memory component 1020 comprises, in one embodiment, one or more memory devices adapted to store data and information, including for example infrared data and information. Memory device 1020 may comprise one or more various types of memory devices including volatile and non-volatile memory devices. Processing component 1010 may be adapted to execute software stored in memory component 1020 so as to perform method and process steps and/or operations described herein.

Image capture component 1030 comprises, in one embodiment, any type of image sensor, such as for example one or more infrared sensors (e.g., any type of multi-pixel infrared detector, such as a focal plane array) for capturing infrared image data (e.g., still image data and/or video data) representative of an image, such as scene 1070. In one implementation, the infrared sensors of image capture component 1030 provide for representing (e.g., converting) the captured image data as digital data (e.g., via an analog-to-digital converter included as part of the infrared sensor or separate from the infrared sensor as part of system 1000). In one aspect, the infrared image data (e.g., infrared video data) may comprise non-uniform data (e.g., real image data) of an image, such as scene 1070. Processing component 1010 may be adapted to process the infrared image data (e.g., to provide processed image data), store the infrared image data in memory component 1020, and/or retrieve stored infrared image data from memory component 1020. For example, processing component 1010 may be adapted to process infrared image data stored in memory component 1020 to provide processed image data and information (e.g., captured and/or processed infrared image data).

Control component 1040 comprises, in one embodiment, a user input and/or interface device, such as a rotatable knob (e.g., potentiometer), push buttons, slide bar, keyboard, etc., that is adapted to generate a user input control signal. Processing component 1010 may be adapted to sense control input signals from a user via control component 1040 and respond to any sensed control input signals received therefrom. Processing component 1010 may be adapted to interpret such a control input signal as a parameter value, as generally understood by one skilled in the art. In one embodiment, control component 1040 may comprise a control unit (e.g., a wired or wireless handheld control unit) having push buttons adapted to interface with a user and receive user input control values. In one implementation, the push buttons of the control unit may be used to control various functions of the system 1000, such as autofocus, menu enable and selection, field of view, brightness, contrast, noise filtering, high pass filtering, low pass filtering, and/or various other features as understood by one skilled in the art.

Display component 1050 comprises, in one embodiment, an image display device (e.g., a liquid crystal display (LCD) or various other types of generally known video displays or monitors). Processing component 1010 may be adapted to display image data and information on the display component 1050. Processing component 1010 may be adapted to retrieve image data and information from memory component 1020 and display any retrieved image data and information on display component 1050. Display component 1050 may comprise display electronics, which may be utilized by processing component 1010 to display image data and information (e.g., infrared images). Display component 1050 may be adapted to receive image data and information directly from image capture component 1030 via the processing component 1010, or the image data and information may be transferred from memory component 1020 via processing component 1010.

Optional sensing component 1060 comprises, in one embodiment, one or more sensors of various types, depending on the application or implementation requirements, as would be understood by one skilled in the art. The sensors of optional sensing component 1060 provide data and/or information to at least processing component 1010. In one aspect, processing component 1010 may be adapted to communicate with sensing component 1060 (e.g., by receiving sensor information from sensing component 1060) and with image capture component 1030 (e.g., by receiving data and information from image capture component 1030 and providing and/or receiving command, control, and/or other information to and/or from one or more other components of system 1000).

In various implementations, sensing component 1060 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 1060 may represent conventional sensors as generally known by one skilled in the art for monitoring various conditions (e.g., environmental conditions) that may have an effect (e.g., on the image appearance) on the data provided by image capture component 1030.

In some implementations, optional sensing component 1060 (e.g., one or more of sensors) may comprise devices that relay information to processing component 1010 via wired and/or wireless communication. For example, optional sensing component 1060 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 1000 may be combined and/or implemented or not, as desired or depending on the application or requirements, with system 1000 representing various functional blocks of a related system. In one example, processing component 1010 may be combined with memory component 1020, image capture component 1030, display component 1050, and/or optional sensing component 1060. In another example, processing component 1010 may be combined with image capture component 1030 with only certain functions of processing component 1010 performed by circuitry (e.g., a processor, a microprocessor, a logic device, a microcontroller, etc.) within image capture component 1030. Furthermore, various components of system 1000 may be remote from each other (e.g., image capture component 1030 may comprise a remote sensor with processing component 1010, etc. representing a computer that may or may not be in communication with image capture component 1030).

Figure 10B:
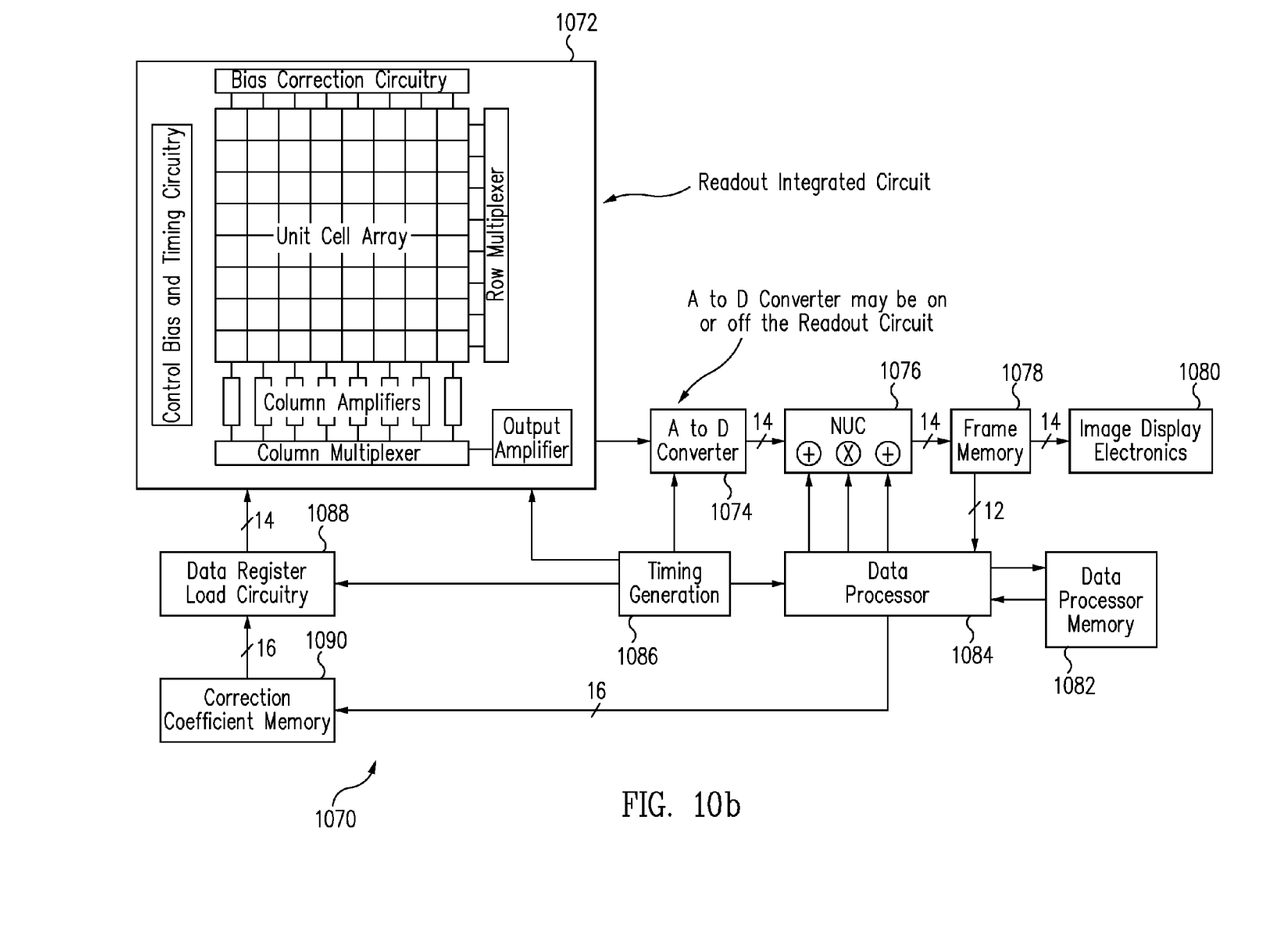
FIG. 10b shows a block diagram illustrating an implementation example for an infrared camera in accordance with one or more embodiments.

FIG. 10*b* shows a block diagram illustrating a specific implementation example for an infrared camera 1070 in accordance with one or more embodiments. Infrared camera 1070 (e.g., a microbolometer readout integrated circuit with bias-correction circuitry and interface system electronics) includes a readout integrated circuit (ROIC) 1072, which may include the microbolometer unit cell array, control circuitry, timing circuitry, bias circuitry (e.g., including anti-ramp circuitry), row and column addressing circuitry, column amplifiers, and associated electronics to provide output signals that are digitized by an analog-to-digital (A/D) converter 1074. The A/D converter 1074 may be located as part of or separate from ROIC 1072.

The output signals from A/D converter 1074 are adjusted by a non-uniformity correction circuit (NUC) 1076, which applies temperature dependent compensation (e.g., Lagrange Offset, Temperature Dependent Gain, and/or additional Offset) as would be understood by one skilled in the art. After processing by NUC 1076, the output signals are stored in a frame memory 1078. The data in frame memory 1078 is then available to image display electronics 1080 and a data processor 1084, which also has a data processor memory 1082. A timing generator 1086 provides system timing.

Data processor 1084 generates bias-correction data words, which are loaded into a correction coefficient memory 1090. A data register load circuit 1088 provides the interface to load the correction data into readout integrated circuit 1072. In this fashion, variable circuitry such as variable resistors, digital-to-analog converters, biasing circuitry (e.g., including anti-ramp circuitry and values), which control voltage levels, biasing, circuit element values, etc., are controlled by data processor 1084 so that the output signals from ROIC 1072 are uniform over a wide temperature range and may be compensated for microbolometer self heating (e.g., pulsed bias heating).

It should be understood that various functional blocks of infrared camera 1070 may be combined and various functional blocks may also not be necessary, depending upon a specific application and specific requirements. For example, data processor 1084 may perform various functions of NUC 1076, while various memory blocks, such as correction coefficient memory 1090 and frame memory 1078, may be combined as desired.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An image detector system comprising:
   a plurality of image detectors configured to form an image detector array;
   a switched capacitor filter configured to receive a reference signal and provide a sampled and filtered reference signal for one or more of the image detectors, wherein the switched capacitor filter comprises:
      a first switch configured to receive the reference signal;
      a first capacitor, having a first terminal coupled to the first switch and a second terminal coupled to a reference voltage, configured to sample the reference signal if the first switch is closed to store a sampled reference signal;
      a second switch having a first switch terminal and a second switch terminal, with the first switch terminal coupled to the first terminal of the first capacitor; and
      a second capacitor, having a first terminal coupled to the second switch terminal and a second terminal coupled to a second reference voltage, configured to couple to the first capacitor to share charge with the first capacitor based on the sampled reference signal if the first switch is open and the second switch is closed to store the sampled and filtered reference signal to provide for the one or more image detectors;
   a third switch, coupled between the first switch and the first terminal of the second capacitor, configured to provide a direct path to bypass the switched capacitor filter and receive the reference signal and provide the reference signal as the sampled and filtered reference signal to the one or more image detectors;
   a fourth switch, coupled between the third switch and the first terminal of the second capacitor, configured to pre-charge the second capacitor with the reference signal if the third switch and the fourth switch are closed; and
   a logic device configured to control the first through fourth switches such that the first capacitor samples the reference signal, the first and second capacitors share charge, the second capacitor provides the sampled and filtered reference signal if the third switch is not controlled to bypass the switched capacitor filter, and the third and fourth switches are controlled to close if the second capacitor is to be pre-charged.

2. The image detector system of claim 1, further comprising a voltage source to provide the reference signal to the first switch, and wherein the second capacitor is configured to provide with the second switch open the sampled and filtered reference signal for the one or more image detectors.

3. The image detector system of claim 1, further comprising a buffer coupled to the first terminal of the second capacitor to receive the sampled and filtered reference signal from the second capacitor, and wherein the second capacitor is configured to provide with the second switch open the sampled and filtered reference signal for the one or more image detectors.

4. The image detector system of claim 3, wherein the buffer provides the sampled and filtered reference signal from the second capacitor as a bias signal for a number of the image detectors within the image detector array.

5. The image detector system of claim 4, wherein the image detector array forms at least a portion of a microbolometer focal plane array of the image detector system.

6. The image detector system of claim 1, wherein the reference voltage and the second reference voltage are at substantially a same voltage level.

7. The image detector system of claim 1, wherein the second capacitor is configured to provide the sampled and filtered reference signal on a two or more frames basis to two or more rows of the image detectors within the image detector array.

8. An image detector system comprising:
   an image detector;
   a logic device;
   a switched capacitor filter configured to receive a reference signal and provide a sampled and filtered reference signal for the image detector, wherein the switched capacitor filter comprises:
      a first switch, having a first switch terminal and a second switch terminal, configured to receive the reference signal at the first switch terminal;
      a first capacitor, having a first terminal coupled to the second switch terminal and a second terminal coupled to a reference voltage, configured to sample the reference signal provided via the first switch, under control of the logic device, and store a sampled reference signal;
      a second switch having a third switch terminal and a fourth switch terminal, with the third switch terminal coupled to the first terminal of the first capacitor; and
      a second capacitor, having a first terminal coupled to the fourth switch terminal and a second terminal coupled to a second reference voltage, configured to be connected to the first capacitor by the second switch, under control of the logic device with the first switch open, to store the sampled and filtered reference signal, wherein with the second switch open the sampled and filtered reference signal is provided by the second capacitor for the image detector;
   a third switch, coupled between the first switch terminal and the first terminal of the second capacitor and under control of the logic device, configured to provide a direct path to bypass the switched capacitor filter and receive the reference signal and provide the reference signal as the sampled and filtered reference signal to the image detector; and
   a fourth switch, coupled between the third switch and the first terminal of the second capacitor and under control of the logic device, configured to pre-charge the second capacitor with the reference signal if the third switch and the fourth switch are closed.

9. The image detector system of claim 8, further comprising a plurality of the image detectors disposed in rows to form an image detector array, and wherein the second capacitor is configured to provide the sampled and filtered reference signal on a two or more frames basis to two or more rows of the image detectors.

10. The image detector system of claim 8, further comprising:
a voltage source to provide the reference signal to the first switch; and
a buffer coupled to the first terminal of the second capacitor to receive the sampled and filtered reference signal from the second capacitor.

11. The image detector system of claim 10, further comprising a plurality of the image detectors disposed in an image detector array, and wherein the buffer provides the sampled and filtered reference signal from the second capacitor as a bias signal for a number of the image detectors within the image detector array.

12. A method of providing a sampled and filtered reference signal to an image detector array, the method comprising:
receiving a reference signal;
sampling the reference signal with a first capacitor to store a sampled reference signal based on the reference signal;
coupling a second capacitor to the first capacitor to share charge stored on the first and second capacitors to generate the sampled and filtered reference signal to store on the second capacitor;
decoupling the second capacitor from the first capacitor, wherein the sampled and filtered reference signal is stored on the second capacitor to provide for one or more image detectors within the image detector array;
providing a direct path configured to bypass the second capacitor and receive the reference signal and provide the reference signal as the sampled and filtered reference signal to the image detector array; and
coupling the second capacitor to the direct path to precharge only the second capacitor with the reference signal if the direct path is providing the reference signal as the sampled and filtered reference signal to the image detector array.

13. The method of claim 12, wherein the second capacitor provides the sampled and filtered reference signal on a two or more frames basis for one or more of the image detectors within two or more rows of the image detector array.

14. The method of claim 12, further comprising:
providing the reference signal; and
buffering the sampled and filtered reference signal from the second capacitor, wherein the sampled and filtered reference signal is provided as a bias signal for a number of the image detectors within the image detector array.

* * * * *